Oct. 3, 1961 W. BUYER 3,002,205
PIPE THREADING DIE SUPPORT HAVING LIMITED PIVOTAL
MOVEMENT ON FRAME CARRIED SLEEVE
Filed Sept. 30, 1958 2 Sheets-Sheet 1

INVENTOR.
WALTER BUYER
BY
ATTORNEY

INVENTOR.
WALTER BUYER

United States Patent Office 3,002,205
Patented Oct. 3, 1961

3,002,205
PIPE THREADING DIE SUPPORT HAVING LIMITED PIVOTAL MOVEMENT ON FRAME CARRIED SLEEVE
Walter Buyer, North Olmsted, Ohio, assignor to The Ridge Tool Company, Elyria, Ohio, a corporation of Ohio
Filed Sept. 30, 1958, Ser. No. 764,343
1 Claim. (Cl. 10—89)

This invention relates to a portable pipe working tool unit.

For the performance of various operations on pipes or tubing it has been common practice to provide a power-driven, rotary chuck which securely grips the pipe or tubing and rotates it. In the past it has been the usual practice to provide a portable working tool which the operator must hold up to the pipe or tubing as the latter is rotated by the chuck. This portable working tool may be a threader, cutter or reamer, for example. The necessity of physically supporting such a working tool imposes a fatiguing burden on the operator which the present invention avoids in a novel and advantageous manner.

In accordance with the present invention there is provided a novel portable working tool unit which is adapted to be removably mounted physically on the base of the chuck and which has provision for the manual adjustment of the tool from an out-of-the-way, inoperative position to an operative position where it is disposed for engagement with the pipe or tubing to be worked on. This novel and advantageous arrangement avoids the necessity for the operator to hold the working tool during the working operation itself.

It is an object of this invention to provide a novel and improved portable pipe working tool unit which is adapted to be removably supported from the base of a power-driven chuck.

It is also an object of this invention to provide such a working tool unit which may be readily adjusted from an out-of-the-way, inoperative position to an operative position, and vice versa, while supported from the base of the chuck.

Another object of this invention is to provide such a working tool unit which is adapted to accommodate tubing or pipes which are out-of-round or not straight.

Other objects and advantages of this invention will be apparent from the following description of a presently preferred embodiment thereof, which is illustrated in the accompanying drawings.

Figure 2:
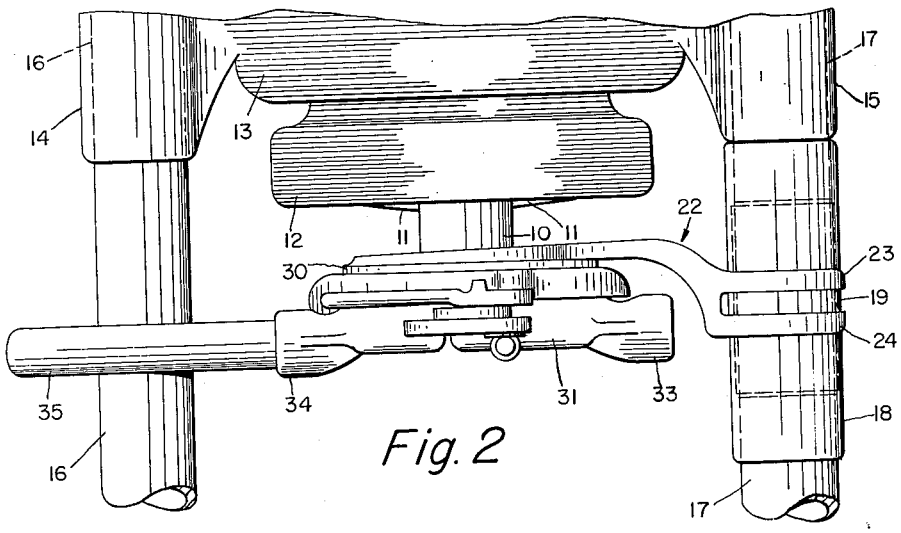
FIG. 2 is a fragmentary top plan view of the FIG. 1 assembly.

Referring to FIG. 2, the pipe 10, which is to be worked on, is gripped by the jaws 11 of a rotatable chuck 12. The chuck is rotatably mounted on a base 13 which may be fixed or portable. A suitable motor drive is coupled to the chuck 12 so that the latter turns and carries with it the pipe 10. The axis of rotation of the chuck is horizontal and coincides as closely as possible with the longitudinal axis of the pipe.

At its opposite sides the base carries integral horizontal sleeves 14 and 15, which are located at the same level, somewhat below the axis of rotation of chuck 12. These sleeves carry a pair of spaced, parallel, cylindrical side bars 16 and 17, which are positioned and shaped to be slidably inserted into the sleeves 14 and 15 and supported by the base of the chuck. Each of these side bars has its longitudinal axis extending parallel to the axis of rotation of the chuck and may be slid inwardly and outwardly relative to the base.

Figure 5:
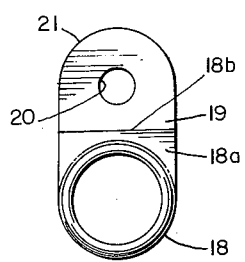
FIG. 5 is a front elevational view, on the same scale as FIGS. 3 and 4, of the sleeve member in the present pipe working tool unit.
Figure 6:
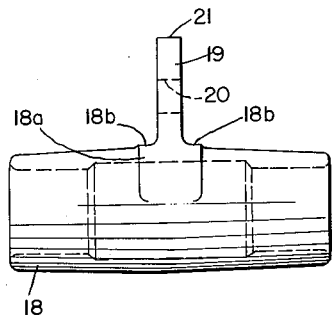
FIG. 6 is an end elevational view thereof.

In accordance with the present invention, there is provided a portable unit including a horizontal cylindrical sleeve member 18 which has an upwardly projecting integral leg 19. As best seen in FIG. 5, this leg has a circular opening 20. The upper end face 21 of the leg is semi-circular, concentric with the axis of the opening 20. The sleeve member 18 has a slidable and rotatable fit on the cylindrical side bar 17. The sleeve member has bosses 18a which present flat, upwardly facing surfaces 18b at the base of the leg 19. These surfaces are disposed slightly above the top of the generally cylindrical portion of the sleeve member and extend the full width of the sleeve member, as best seen in FIG. 5.

Figure 3:
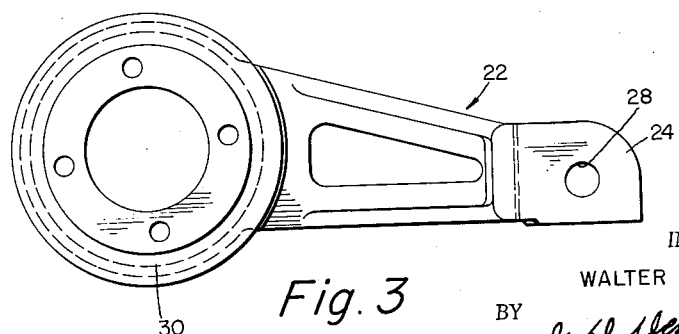
FIG. 3 is a front elevational view, on a slightly larger scale than that of FIGS. 1 and 2, of the arm member in the present working tool unit.
Figure 4:
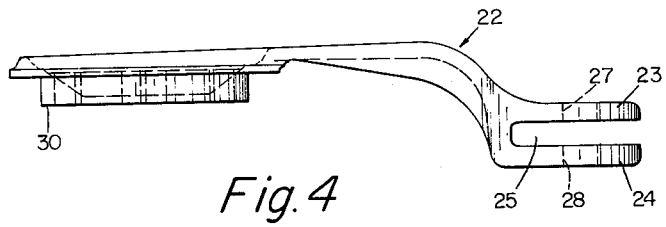
FIG. 4 is a top plan view, on the same scale as FIG. 3, of the arm member shown in FIG. 3.

The unit also has an arm member 22 (FIGS. 3 and 4) which is bifurcated at its right end, presenting two axially spaced fingers 23 and 24. Between these fingers the arm member defines a recess 25 for receiving the upstanding leg 19 on the sleeve member 18. This recess is open at the top and bottom and at the right side of the arm member and is closed at its inner side. The fingers 23, 24 on arm member 22 are formed with aligned circular openings 27 and 28.

Figure 1:
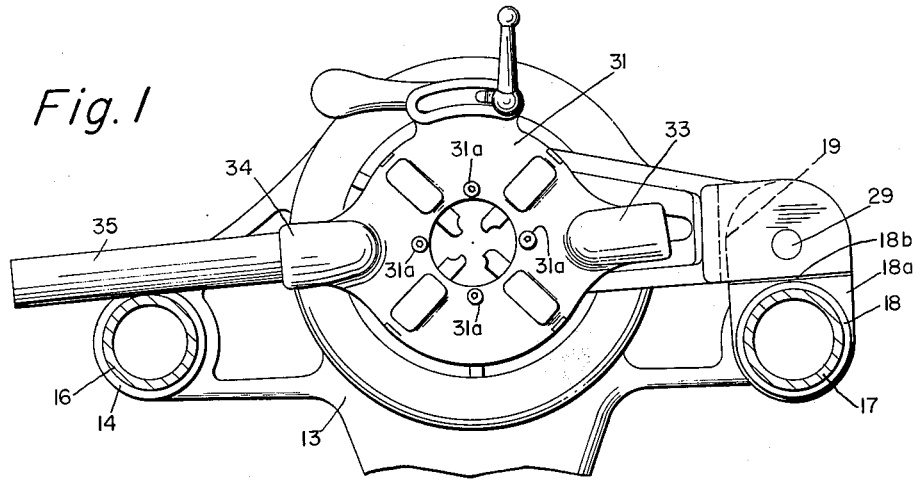
FIG. 1 is a front elevational view of the present working tool unit supported from the base of a power-driven chuck.

When the arm member 22 is mounted on the sleeve member 18, the upstanding leg 19 on the latter is received in the recess 25 and the openings 20, 27 and 28 are aligned. A pin 29 (FIG. 1) extends through these aligned openings to connect the arm member 22 pivotally to the sleeve member 18. As shown in FIG. 1, the upwardly facing, flat surfaces 18b of the bosses 18a on the sleeve member are spaced a slight distance below the bottom edges of the fingers 23 and 24 on the arm member to permit relative limited pivotal movement to take place between the sleeve member 18 and the arm member 22. This pivotal movement is sufficient to take care of any out-of-round condition of the pipe. However, such relative movement is limited so that when the operator initially positions the threading tool for engagement with the pipe, the tool cannot be but a slight amount off center with respect to the pipe.

At its left end the arm member 22 has an annular portion 30 to which the housing 31 of the pipe forming tool is attached rigidly by means of screws 31a (FIG. 1). In the illustrated embodiment, the forming tool is shown as a threader, having chasers 32 for engagement with the periphery of the pipe 10 to cut threads thereon as the pipe is rotated. However, the forming tool might be a cutter or a reamer, if desired.

The threading tool itself is of known construction, having two oppositely disposed sockets 33 and 34 for receiving the handles by which the operator held the tool manually in accordance with the prior practice. However, in the present instance only one such handle is needed. This is located at the left side of the tool and is designated by the reference numeral 35 in FIGS. 1 and 2.

As shown in FIG. 1, this handle is positioned to rest on top of the left side bar 16 of the working tool unit when the tool is positioned opposite the chuck 12. Therefore, the entire weight of the present working tool unit is supported from the base of the chuck while the pipe working operation is going on, thus relieving the operator of this burden.

In use, the operator mounts the present pipe working tool unit on the base of the chuck by sliding the sleeve member 18 into the side bar 17 supported by the chuck base 13. When the unit is not in use, the handle 35, working tool 31, arm member 22 and sleeve member 18 may be turned as a unit about side bar 17 so as to hang straight down from the latter. This is the inoperative position of the unit, in which it is out of the operator's way. Preferably, the unit is moved to the inoperative position by first pushing the side bar 16 rearwardly to a position in back of the handle 35 and then permitting the tool unit 31 to drop down to the inoperative position. Alternatively, without retracting the side bar 16, the tool unit may be swung up clockwise around side bar 17 and down to the inoperative position.

When the operator wishes to perform a threading operation, he simply grasps the handle 35 and swings the entire unit in the opposite direction about side bar 17 to the FIG. 1 position, where its entire weight is supported from the base of the chuck by the side bars 16 and 17. If the side bar 16 had been retracted when the unit was moved to its inoperative position it must be pulled forward to provide a support for handle 35, of course.

Figure 7:
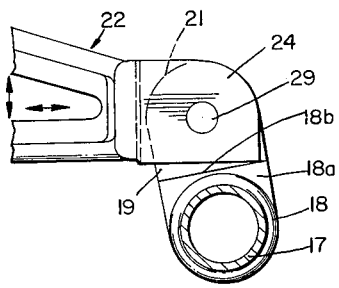
FIG. 7 is a fragmentary front elevational view showing the relative positions which the arm and the sleeve may assume when the pipe being worked on is out-of-round or not straight.

An important aspect of the present invention relates to the manner in which it automatically accommodates itself to out-of-round or crooked pipes. If such a pipe is being worked upon, its axis, rather than remaining fixed, will move circularly about the axis of rotation of the chuck. With the present construction, the arm member 22 and the housing 31 of the threading tool can follow such orbital movement of the pipe because of the rotatable mounting of sleeve member 18 on the side arm 17, the pivotal connection of the arm member 22 to the sleeve member 18, and the spacing, in the normal position of the parts, between the upwardly facing, flat boss surfaces 18b on the sleeve member and the lower edges of the fingers 23 and 24 on the arm member. Due to this arrangement, the arm member 22 is free to move in all directions in a plane perpendicular to the axis of rotation of the chuck, so to follow the movement of the pipe as the latter is turned by the chuck. In so doing, the arm member 22 may pivot with respect to the sleeve member 18 and may cause the sleeve member to turn angularly about the side arm 17 on which it is rotatably mounted, as shown in FIG. 7.

From the foregoing, it will be apparent that the illustrated embodiment is convenient to use and is highly effective for the intended purposes of this invention. However, it is to be understood that, while there has been described in detail and illustrated herein a specific presently-preferred embodiment of this invention, various modifications, omissions and refinements which depart from the disclosed embodiment may be adopted without departing from the spirit and scope of this invention.

I claim:

A support for a portable pipe working tool comprising a sleeve having an upstanding leg, and an arm member which is bifurcated at one end and presents a recess thereat which receives said upstanding leg on the sleeve member, said bifurcated end of the arm member being pivotally connected to said upstanding leg on the sleeve member for relative pivotal movement between said members perpendicular to the axis of said sleeve member and having a flat surface spaced from and opposite the pivot point along the lower edge, and said arm member having an annular portion at its opposite end for attachment to the pipe working tool, said sleeve member presenting a flat upwardly-facing surface which is normally spaced below the lower edge of the bifurcated end of the arm member to limit said relative pivotal movement between the arm member and the sleeve member.

References Cited in the file of this patent

UNITED STATES PATENTS

| | | |
|---|---|---|
| 2,079,181 | Pealer | May 4, 1937 |
| 2,314,016 | Peters | Mar. 16, 1943 |
| 2,678,453 | Rudolph | Nov. 18, 1954 |
| 2,768,550 | Ingwer | Oct. 30, 1956 |